(12) United States Patent
Readler

(10) Patent No.: US 10,572,534 B2
(45) Date of Patent: Feb. 25, 2020

(54) DISTRIBUTED COORDINATED RECORDING

(71) Applicant: Blaine Clifford Readler, San Diego, CA (US)

(72) Inventor: Blaine Clifford Readler, San Diego, CA (US)

( * ) Notice: Subject to any disclaimer, the term of this patent is extended or adjusted under 35 U.S.C. 154(b) by 32 days.

(21) Appl. No.: 16/029,420

(22) Filed: Jul. 6, 2018

(65) Prior Publication Data

US 2020/0012742 A1    Jan. 9, 2020

(51) Int. Cl.
*G06F 16/61* (2019.01)

(52) U.S. Cl.
CPC .................. *G06F 16/61* (2019.01)

(58) Field of Classification Search
CPC ....................................... G06F 16/61
USPC ........................................... 700/94
See application file for complete search history.

(56) References Cited

U.S. PATENT DOCUMENTS

| | | | |
|---|---|---|---|
| 5,185,680 A | 2/1993 | Kakubo | |
| 5,245,667 A | 9/1993 | Lew | |
| 6,710,815 B1 | 3/2004 | Billmaier | |
| 7,209,795 B2 | 4/2007 | Sullivan | |
| 7,324,857 B2 | 1/2008 | Goddard | |
| 7,333,519 B2 | 2/2008 | Sullivan | |
| 7,392,102 B2 | 6/2008 | Sullivan | |
| 2005/0259754 A1 | 11/2005 | Ho | |
| 2006/0233203 A1 | 10/2006 | Iwamura | |
| 2009/0068943 A1 | 3/2009 | Grandinetti | |
| 2009/0172200 A1 | 7/2009 | Morrison | |
| 2014/0067102 A1* | 3/2014 | Sanders | A61F 2/30767 700/94 |
| 2014/0355951 A1* | 12/2014 | Tabak | G11B 27/10 386/241 |

* cited by examiner

*Primary Examiner* — Hemant S Patel

(57) ABSTRACT portable recording devices digitize audio signals and store the resulting digital audio samples locally. A master device periodically communicates a time marker and index value. Upon receiving a time marker from the master device, the recording devices latch their sample recording address occurring at that time, and store this latched address along with the received index value. Since the same index value is associated with recorded sample addresses occurring at the same time across all units, the shared index value provides a coordination means to later align the individual recordings, emulating a central multi-track recorder. Optionally, one of the portable recording devices can assume the additional role of master.

6 Claims, 6 Drawing Sheets

DISTRIBUTED COORDINATED RECORDING

CROSS-REFERENCE TO RELATED APPLICATIONS

Not Applicable.

SEQUENCE LISTING

Not Applicable

BACKGROUND

Field of Invention

This invention relates to audio recording, and specifically to distributed audio recording incorporating coordinated time indexing.

Description of Prior Art

Note that herein, the term "voice" refers to not only the human vocal ability, but also to the sounds created by musical instruments, whether acoustic, or the electrical signature of electrical/electronic instruments.

Multi-track audio recording, where multiple channels of audio information are recorded simultaneously, has become a desirable tool for musicians and vocalists performing together. While multi-track recording has been the standard method of studio recording for over fifty years, digital technology has evolved to allow its use in informal situations, for example, for use in composition. Here, "sound on sound" overdubbing allows the composer to build up multiple channels, i.e., voices, with successive recording sessions.

Although useful for the individual artist, these relatively inexpensive devices are ineffective for group use, since they typically provide only one or two channel inputs, whereas groups require individual channel inputs, so that the various voices can be recorded on their own channels simultaneously. Although multiple input multi-track recorders are available, the cost quickly becomes prohibitive for casual users. Additionally, it is not always possible to predict ahead of time how many channels will eventually be needed. Technology exists to couple multiple multi-track recorders together, effectively creating a multi-track recorder with additional channels, but, as U.S. Pat. No. 5,185,680 demonstrates, this is not straightforward, since the playback of all the recorders must be synchronized together.

Also, assuming the casual user chose to spend the substantial amount of money on a multi-input recorder, each group member requires their own microphone, and attending microphone cord, creating an unwieldy mess of cords cluttering, for example, a living room.

A solution to these problems would be to leverage the advances in memory component miniaturization. Instead of the various voices being recorded on the individual channels of a multi-track recorder central device, each musical contributor would record their own voice (human or otherwise) locally, in essence creating a distributed virtual multi-track recorder. For example, the required recording electronics and memory storage could easily be housed inside a standard high-quality microphone, powered by a battery. An additional advantage is that the microphone cord, and attending clutter, would be eliminated.

Once a session has been recorded, the various stored recorded files would need to be synchronized and merged for playback. Methods for synchronizing different audio sources have been explored in other scenarios. US Published Patent Application No. 2009/0068943 describes means for achieving a high quality recording of a shared event using multiple recording devices, where each device records the same audio source, versus the multiple voice recordings of a distributed virtual multi-track recorder. Here, the various recordings of the shared event are synchronized together by controlling the start and stop recording of all devices together, and then either inserting timestamps at the beginning and end of each recording, or using clearly distinguishable events in the audio stream to graphically align the multiple recordings. Either method presents difficulties: timestamps—indications of real or relative actual time—must be themselves synchronized among the multiple units, and identification of clearly distinguishable events is imprecise and not amenable to automatic operation.

U.S. Pat. No. 5,245,667 teaches the use of interpolation filters to aid in the synchronization of multiple audio streams by an effective virtual synchronization of the various source sample clocks. The method still requires precise alignment of reference points in the files, e.g., an exact beginning, and thus does not relieve the need for real-time coordination.

Another class of synchronizing multiple recorded audio and/or video data streams involves merging multiple streaming sources on the internet. US Published Patent Application Nos. 2006/0233203 and 2005/0259754 describe using Phase-locked loops and voltage-controlled oscillators adjusted by embedded data stream timestamps to synchronize the destination operation clocks with that of the source. US Published Patent Application No. 2009/0172200 describes using the internet standard NTP (Network Time Protocol) timing mechanism to align audio data streams by buffering and delaying them each according to their distance from their individual performing musicians. Similarly, U.S. Pat. No. 6,710,815 describes manual adjustment of the individual buffer delays of multiple channels in order to compensate for different internet transport delays. Although these complex methods might be useful for synchronizing multiple real-time audio streams, they are not appropriate for post-recording alignment of audio data files.

Yet another class of multiple data stream synchronization involves a single audio source feeding multiple playback devices, as, for example, in multicast or surround-sound systems. Here the problem is compensating for various latencies so that the audio signal is presented all at the same time at each of the multiple playback devices. U.S. Pat. No. 7,209,795 describes inserting identifiable pulses in the audio stream, which are used to align the time-buffered signals and assumes the ability to synchronize the operating clocks of the playback devices via existing network clock synchronization methods. U.S. Pat. No. 7,333,519 follows on from U.S. Pat. No. 7,209,795 to describe a method for manually aligning in time the audio signals from the multiple playback devices. U.S. Pat. No. 7,392,102 also follows on from U.S. Pat. No. 7,209,795 to describe using an audio sample to directly align in time the audio signals from the multiple playback devices. U.S. Pat. No. 7,324,857 describes the use of a microphone to detect the location in time of a audio patterns emitted from playback devices in order to determine and adjust for delivery latencies. As with the methods for synchronizing multiple real-time audio streams discussed above, these complex methods for synchronizing a single real-time source with multiple playback devices are not appropriate for post-recording alignment of audio data files.

Desirable in a virtual distributed multi-track recorder system would be a means to record the various voices in such a way that later synchronization is achieved automatically, without the need for manual time alignment of the multiple streams of recorded audio samples. Also desirable would be for each performer to be able to individually start and stop their recording, without regard to the state of other performer's recording. Additionally desirable would be for a method that does not use GPS information, since these communications are unreliable inside many structures.

SUMMARY OF THE INVENTION

In accordance with the present invention, a method and apparatus for implementing distributed coordinated recording includes two or more audio signal input devices, each with its own means to digitize and record the audio signal source local to it. As the digitized audio signal is stored in local memory sample-by-sample by each recording device, a master device periodically communicates mutually shared unique indexes that are simultaneously recorded by each device operating in a slave mode, along with associated current storage sample memory addresses local to each recording device. Index values are unique from one index occurrence to the next. Later processing of the recorded digital sample files of the various recording devices uses the shared indexes to align the audio samples of the files so that the signal streams represented by the sample files occur together in the same time orientation as was the case when the original recordings were made. In this way, the multiple of recorded audio signal streams can be mixed together in the same way as if they had been recorded on separate channels of a central multi-track recorder.

In a second aspect of the present invention, the indexes transmitted by a master device to slave devices are accompanied by a uniquely identifiable pattern that serves as a time marker, i.e., the point in time when the current index is to be applied.

In a third aspect of the present invention, once a recording session is complete, the recorded digital audio streams, along with the recorded indexes and associated sample memory addresses, are uploaded to a common computer via either wired links, e.g., USB, or wirelessly, e.g., via Bluetooth. Since the unique index values are associated with specific audio stream samples—approximately all at the same time across the master and slave devices—later computer processing can use them to align the audio streams, emulating a central multi-track recorder.

In a fourth aspect of the present invention, one of the recording devices can assume the master role, whereby it creates the associative indexes and communicates them to the other recording devices, which have assumed a slave role, and also uses the same index itself. The master device can provide the created indexes to the slave devices wirelessly, by, for example, a low-bandwidth radio frequency link. The selection of the master device could be done manually by a user, or automatically, for example as the first recording device to be placed in a record mode. In this case, a device being placed into record mode first "listens" to determine if an existing master is transmitting indexes, and, if so, places itself into a slave mode. If no other master is detected, then the recording device assumes a master role.

Although examples herein refer to musical performances, it will be understood that the invention could apply to any situation where it would be advantageous to record multiple sources of audio simultaneously.

DETAILED DESCRIPTION OF THE INVENTION

According to the invention described here, portable recording devices digitize audio signals and store the resulting digital audio samples locally in addressed memory. Recording devices could use microphones or accept direct signals from, e.g., electronic musical instruments. A master device periodically communicates a time marker and index value, e.g., over a radio frequency (RF) link. One of two or more recording devices could assume the master role. Upon receiving a time marker from the master device, the remaining devices, i.e., slave devices, latch their associated audio sample storage memory address occurring at that time, and store this latched address along with the received index value. In the preferred embodiment index values are sequential, and can thus be used as the storage address for the associated latched audio sample address. Since a master recording device also stores its current audio sample address and broadcast index value in a similar fashion, a single index value is associated with recorded audio sample addresses occurring at the same time across all devices. These shared index values provide a coordination means to later align the individual recordings, emulating a central multi-track recorder. Thus, by these means, a distributed coordinated recording system is realized.

Figure 1:
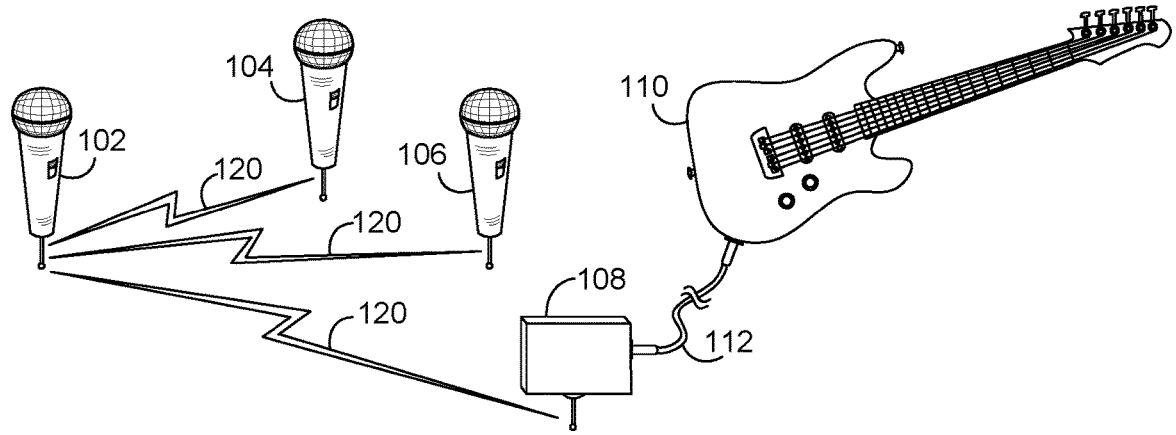
FIG. 1 shows an embodiment of the invention as might be used for musical performance.

Embodiment of the Invention as Might be Used for Musical Performance, FIG. 1

FIG. 1 shows inventive recording devices as might be used during musical performing. Microphones 102, 104, and 106 are powered by batteries, and include the electronics to implement the recording device functions described herein, including digitizing the audio signal, and recording the resulting audio samples, as well as the associative indexing information, as explained in detail below. Similarly, auxiliary recording device 108 provides similar functions for recording the performance of guitar 110, connected via standard ¼ inch phone plug musical cord 112.

In this example illustration, microphone 102 has assumed the role of master, and communicates periodic time markers and index values to slave microphones 104 and 106, as well as auxiliary recording device 108.

Figure 2:
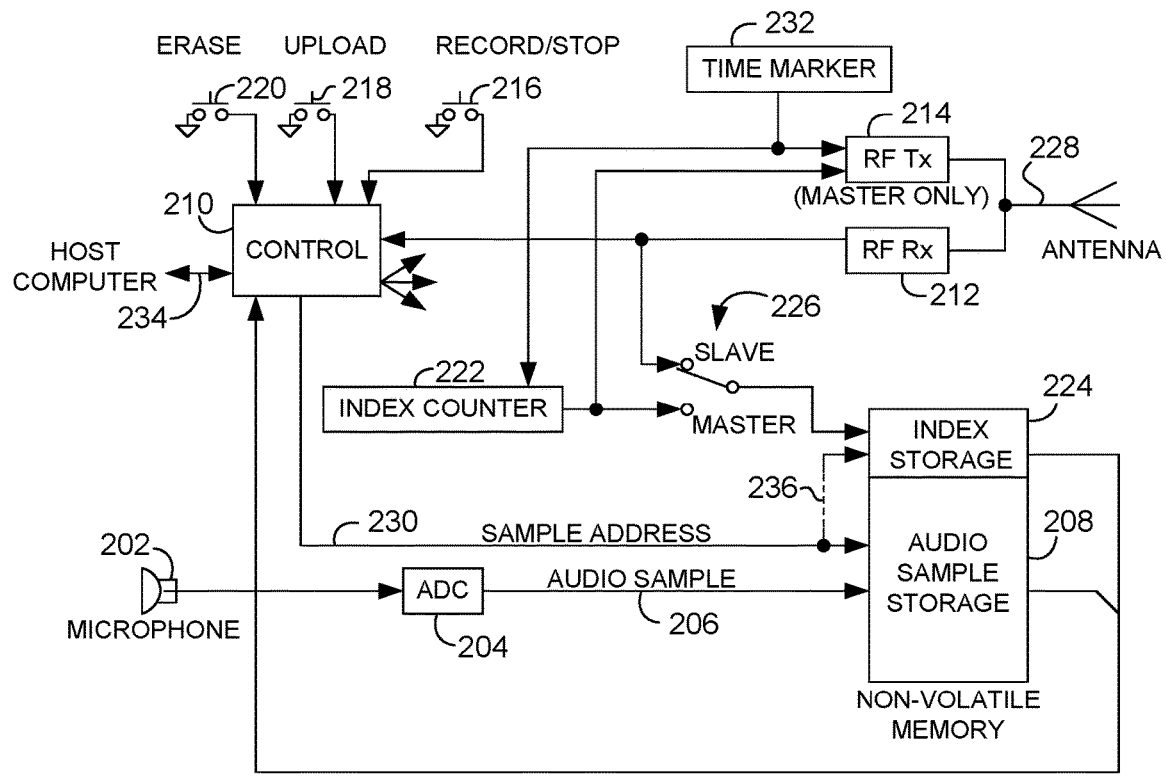
FIG. 2 is a block diagram of a microphone recording device.

Block Diagram of a Microphone Recording System, FIG. 2

FIG. 2 shows the block-level operation of a microphone recording system. Two parallel operations occur during each recording session: 1) audio sample storage, and 2) associative index handling. Here, a session is defined to begin when recording begins, and end when recording is stopped.

The first operation, audio sample storage, comprises steps well known in the art. Electrical signals delivered by microphone element 202 are digitized by Analog-to-Digital Converter (ADC) 204 at a fixed sampling rate. While the preferred embodiment uses a sampling rate of 44.1 KHz (CD quality), any number of other rates could be used. For example, higher rates could be used for studio quality sampling (requiring more memory per recording time), while lower rates could be used for applications tolerant to reduced high-frequency definition, i.e., practice sessions. While not shown in FIG. 2, it will be understood that standard audio sampling, well known in the art, includes anti-aliasing filtering prior to the ADC. Resulting digital audio samples 206 are written to non-volatile memory 208 sequentially, with each subsequent sample written into a next-higher address location. Each recording session begins with the first sample located at the lowest address in memory area reserved for the audio samples.

The second operation, associative index handling, comprises the steps key to eventual merging of two or more simultaneous recordings. If master device selection is done automatically, then at the beginning of a recording session, initiated by manual activation of push-button switch 216, control function 210 first monitors the output of RF RX function 212 to determine whether a different recording device has already assumed the role of master and is broadcasting indexing information. RF RX function 212 receives its input from antenna 228, which is shared with RF TX function 214, explained later. If control function 210 detects received indexing information, then it assumes a slave role, whereby the received index value (explained later) is written into reserved section 224 of non-volatile memory via virtual switch 226. Additionally, at the time that the received accompanying time marker (also explained later) is detected, control function 210 causes the value of audio sample address 230 to also be written into reserved section 224 of non-volatile memory in a manner that is associated with the received index value as will be explained later. In this way, the received index value is now also associated with the audio sample occurring at the arrival of the time marker. Although the preferred embodiment stores the audio sample address 230 along with the received index value into non-volatile memory, it is understood that any value that is correlated with the audio sample address could serve, as shown in broken line 236. Therefore, any references herein to "audio sample address" includes values that are correlated with them.

If, after recording is initiated, control function 210 does not detect received index information for a predetermined period of time (500 milliseconds, in the case of the preferred embodiment), it assumes the role of master, on the assumption that it is the first recording device to be initiated. As master, it activates RF TX function 214 to broadcast index values as created by Index Counter 222, along with a time marker created by Time Marker function 232. Time markers are generated at periodic intervals by Time Marker function 232, in the preferred embodiment, every 100 milliseconds. The occurrence of each time marker causes both the broadcast of the index value and time marker, as well as an incrementing of the Index Counter 222, thus creating a sequential index value for each broadcast.

When in master mode, control function 210 causes virtual switch 226 to store the broadcasted index value, along with the value of Sample Address 230 that occurs at the time that the time marker is broadcast. In this way, a recording device in master mode stores index values and associated sample addresses in the same manner as recording slave devices participating in the session.

A recording session, whether in slave or master mode, is ended by a second manual activation of push-button 216. The stored audio samples, along with indexing information, are uploaded to a host computer via communication link 234 upon activation of upload push-button 218. Optionally, e.g., when the link is Bluetooth, data uploads could be initiated by the host computer.

Non-volatile storage, e.g., flash memory, often must be erased before new data can be written. The user can initiate a non-volatile memory erasure by activating push-button switch 220 once the audio sample and indexing information upload is complete. Optionally, e.g., when the link is Bluetooth, non-volatile memory erasing could be initiated by the host computer.

Although the preferred embodiment uses non-volatile memory for audio sample and index storage, since this allows the recording device to be de-powered before host computer upload, volatile memory in whole or part, could, of course, be used as well.

An auxiliary recording device, such as the example device 108 in FIG. 1, would simply replace the microphone with a buffer amplifier to mate the electrical input signal to the ADC. The input signal could be a line-level audio form, or direct from an electrical musical instrument, such as, for example, guitar 110 of FIG. 1.

Figure 3A:
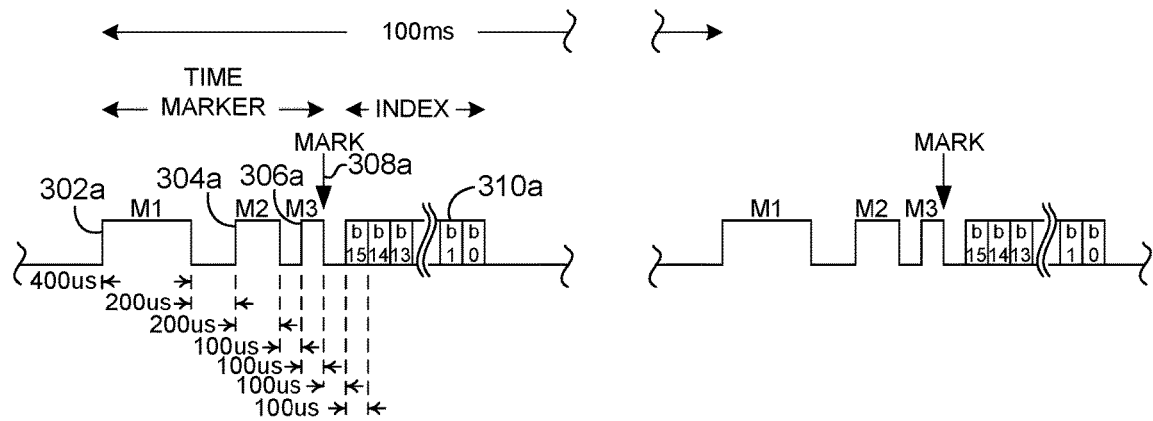
FIG. 3a shows a timing diagram of a time marker and associative index as broadcast on the RF link.

Timing Diagram of a Time Marker and Associative Index as Broadcast on the RF Link, FIG. 3*a*

FIG. 3*a* is a representation of the signal broadcast periodically by a master device (every 100 milliseconds for the preferred embodiment). In the preferred embodiment, a time marker sequence consists of the three pulses, 302*a* M1, 304*a* M2, and 306*a* M3. The end of pulse M3 marks the point in time defined by the time marker, shown here as mark 308*a*. At this time recorder devices latch the current audio sample address for storage, as described above. The pulses in the time marker sequence differ in width in order to not be confused with interference that could likely be occurring as a signal with regular periods.

The time marker is followed by a serialized presentation of a sixteen-bit index value 310*a*, with the most-significant bit occurring first, and the least-significant last. Each serialized bit is the same width in time, as is the idle gap between the mark occurrence and the beginning of the sequence. This allows the RF RX function 212 of FIG. 2 to acquire the index value bits by asynchronous sampling techniques well know in the art. Specifically, each index bit is sampled at an assumed midway point as determined by counting processing clocks starting from the mark at the end of M3.

Since the shortest signal component of the broadcast signal of the preferred embodiment is 100 microseconds, the RF link need only carry information at a maximum data bandwidth of $\frac{1}{100}$ us, or 10 KHz. This is easily accommodated by virtually any radio frequencies allocated by the FCC for unlicensed use, e.g., the 410 MHz to 420 MHz band. Further, the time marker encoded pattern and low bandwidth facilitate the use of simple AM OOK (amplitude modulation, on/off keying) RF modulation, where a high level shown in FIG. 3*a* represents the presence of an RF carrier, and a low level the absence. Not shown in FIG. 3*a* are 2 ms wide "keep-alive" pulses sent at 20 ms intervals between time marker/index transmissions. These serve to keep the front-end gain of RF RX 212 in FIG. 2 at a reduced level, thus preventing spurious low-amplitude RF noise from interfering.

Note that although the signal form and time periods shown are used for the preferred embodiment, many variations of device timing, time marker format, and index value communication are possible, so long as the method includes an identifiable mark in time, and an accompanying index value.

Figure 3B:
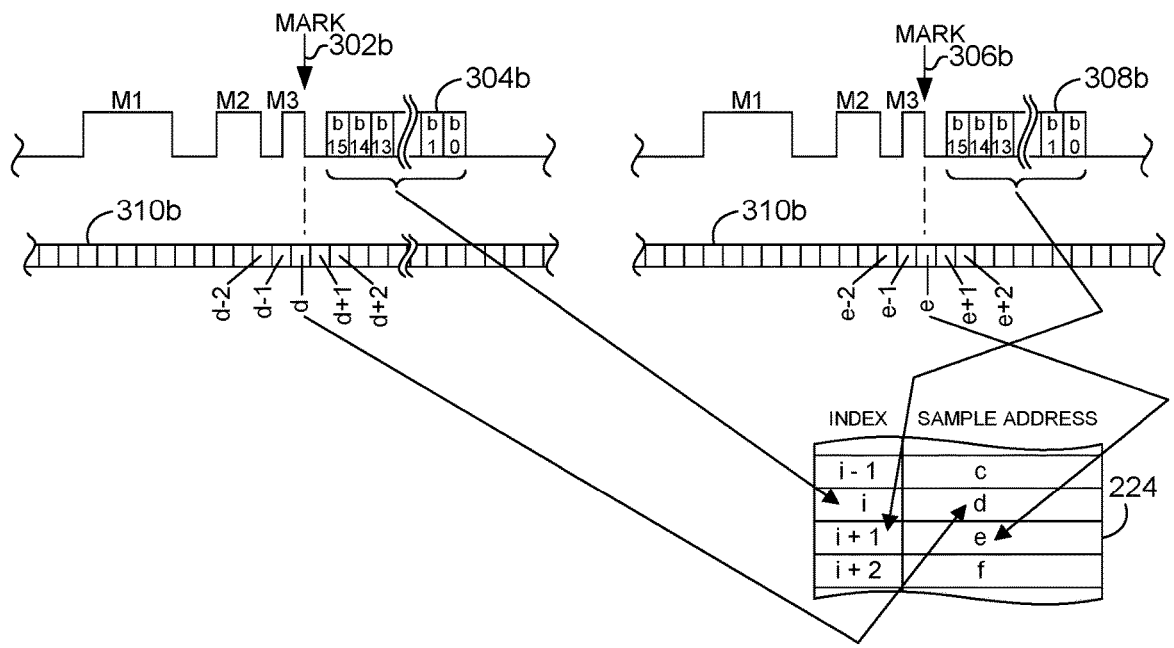
FIG. 3b shows how recording sample addresses are associated with arriving index values.

Recording Sample Addresses are Associated with Arriving Index Values, FIG. 3b

FIG. 3b now adds audio sample addresses 310b to the broadcast signal shown previously in FIG. 3a. Audio sample addresses 310b increment continually at the audio sample rate during recording as the sampled audio values are stored in memory, as shown in FIG. 2 above. At the occurrence of each time marker mark, the current audio sample address is latched and held until the arriving index value is received, at which point, both are stored in memory.

In FIG. 3b, for example, audio sample address "d" happens to be the current value at the time of occurrence of time marker mark 302b, and is latched. Once the index value 304b arrives, here denoted as "i", both are stored in the index storage section 224 of non-volatile memory, as shown previously in FIG. 2. Since index values are sequential, they are used to comprise a portion of the address of the index storage section of memory. When the next broadcast signal arrives, at time marker mark 306b the latched audio sample address "e" is stored in the next location of the index storage section of memory, since this arriving index value 308b is i+1. In this way, the arriving index values are stored in memory virtually, by their location in memory.

If the index storage section of memory is located at the beginning of the non-volatile memory, then the full memory address would consist of the index value, padded with most-significant zeros. If the index storage section of memory is located elsewhere, then, for example, the most significant portion of the complete address could be a fixed value, i.e., the offset of the beginning of the index storage section. And, if the index storage section resides in a dedicated memory, then the index value comprises the complete address.

Note that a sixteen-bit index value represents up to 65,536 memory locations, which, at 100 milliseconds per location for the preferred embodiment, could accommodate up to one hour and forty-nine minutes of recording session time.

Figure 4:
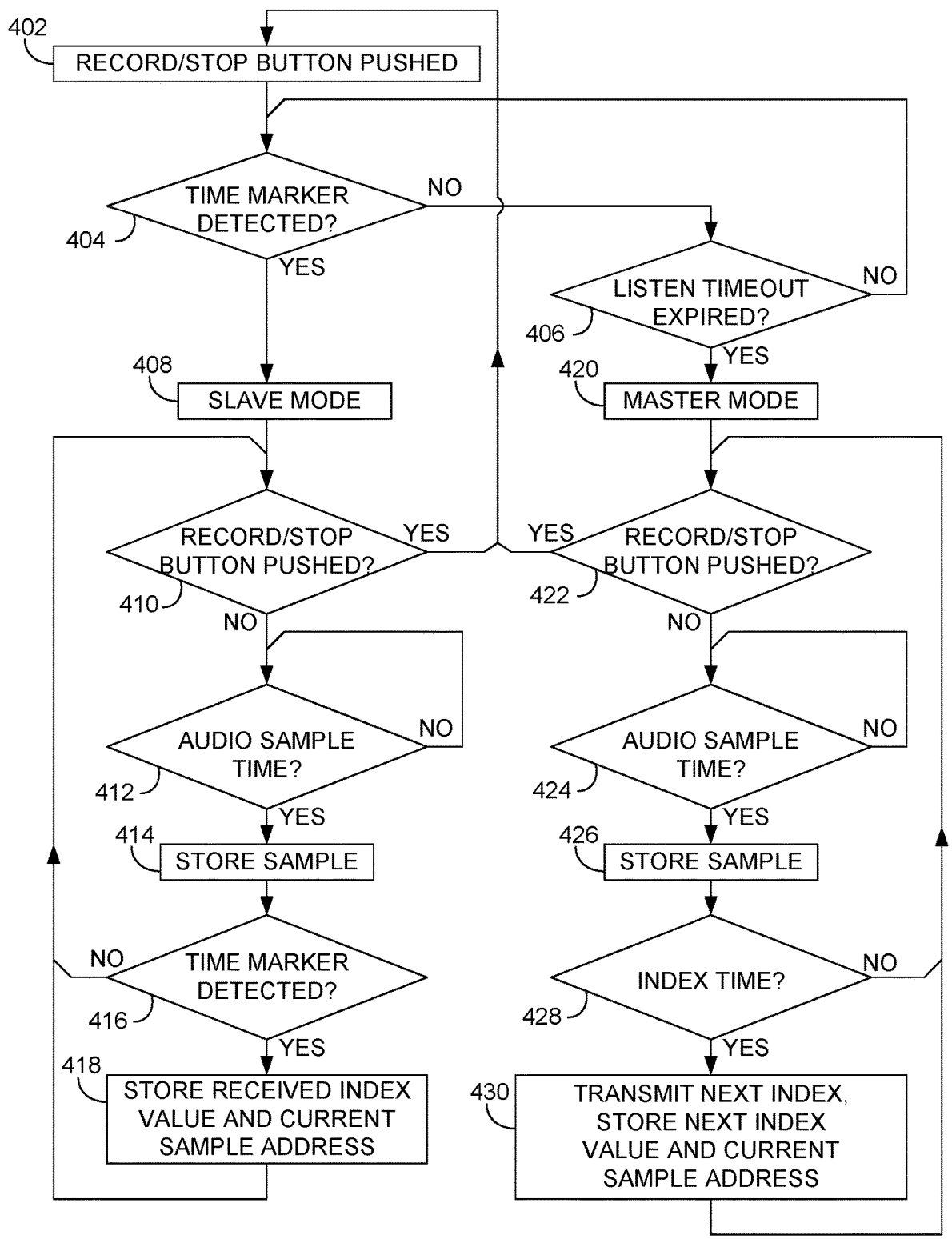
FIG. 4 shows the flow of operation during recording.

Flow of Operation During Recording, FIG. 4

FIG. 4 shows a flow diagram of a recording device's operation when a recording session is initiated for embodiments that allow a recording device to assume the role as master. When the record/stop button 216 of FIG. 2 is pushed and detected in step 402, steps 404 and 406 together determine whether this recording device will operate in master or slave mode. If no time marker is detected by the end of the listen timeout 406, then the recording device is placed in master mode in step 420. If, on the other hand, a time marker is detected before the end of the listen timeout, then the recording device is placed in slave mode in step 408.

If placed in master mode in step 420, then until the record/stop button 216 of FIG. 2 is pushed in step 422, the device waits for the next audio sample time—based on the audio sample rate—to occur. Once the next audio sample time occurs in step 424, the sampled audio value is stored in memory in step 426, and if the next time index time-100 milliseconds, in the preferred embodiment—has arrived in step 428, then the recording device transmits the next index value, and stores this same index value along with the current sample address in step 430. If upon an audio sample time occurring, the next index time has not arrived in step 428, then the recording device simply waits for the next audio sample time to arrive in the next step 424, after ensuring that the record/stop button has not been pushed in step 422.

If placed in slave mode in step 408 (or for embodiments where the master device is dedicated), then until the record/stop button 216 of FIG. 2 is pushed in step 410, the device waits for the next audio sample time to occur in step 412. Once the next audio sample time occurs, the sampled audio value is stored in memory in step 414, and if a time marker has been detected in step 416, then the recording device stores the received index along with the current sample address in step 418. If upon an audio sample time occurring in step 412, and a time marker has not been detected, then the recording device simply waits for the next audio sample time to arrive in the next step 412, after ensuring that the record/stop button has not been pushed in step 410.

Figure 5:
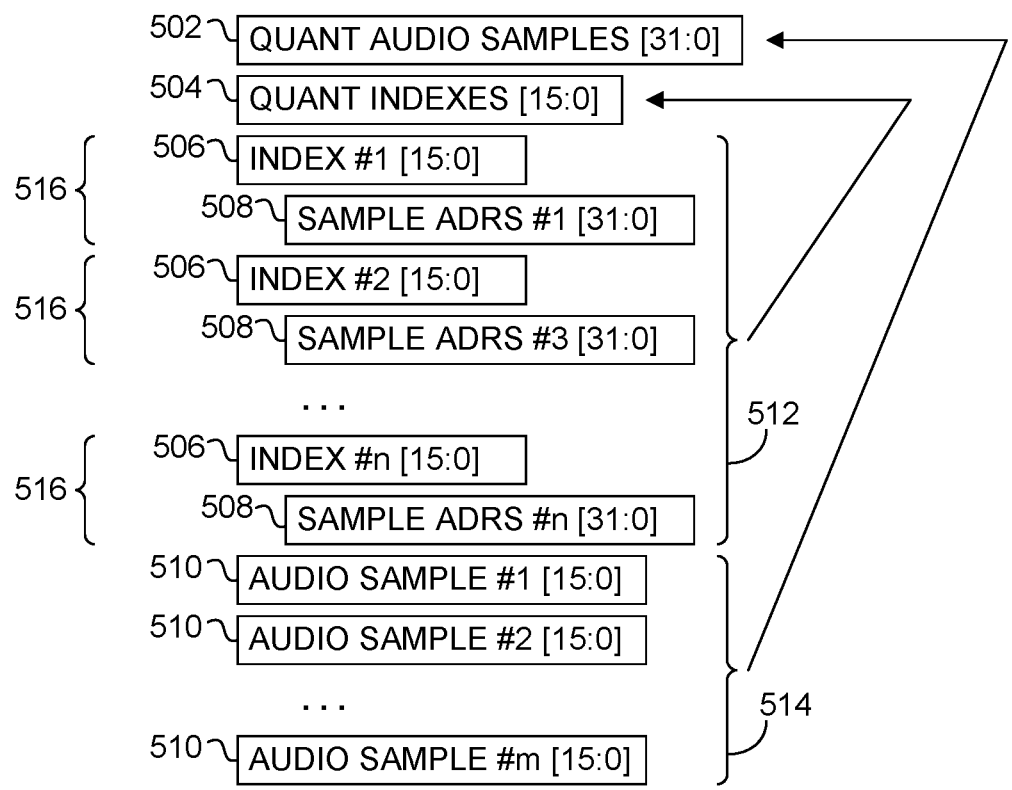
FIG. 5 shows the structure of the file uploaded to a host computer.

Structure of the File Uploaded to a Host Computer, FIG. 5

FIG. 5 shows the structure of the files uploaded to a host computer for processing in the preferred embodiment. This occurs after a recording session is complete and either upload button 218 of FIG. 2 is pushed, or the recording device is commanded to upload by the host computer. The entries of the file are grouped generally into two groups. The first group 512 in the figure consists of sixteen-bit index values 506, and associated thirty-two-bit sample address values 508. The second group 514 in the figure, which follows, consists of the individual audio samples 510. Note that the sample address values 508 that are associated with stored indexes 506 are referenced to the beginning of the audio sample group 514. I.e., audio sample #1 would have an address value of 0x00000000, audio sample #2 would have an address value of 0x00000001, etc.

The first entry 502 of the uploaded file is the total quantity of audio samples 510 included in the uploaded file within the group 514. In this example, entry 502 would have the value "m." The second entry 504 of the uploaded file is the total quantity of index value 506 and associated sample address 508 pairs 516. In this example, entry 504 would have the value "n." Note that the index quantity value 504 infers the location of the beginning of audio sample file group 514 in the file.

In the preferred embodiment, the audio samples 510 are in the form of sixteen-bit signed binary.

Figure 6:
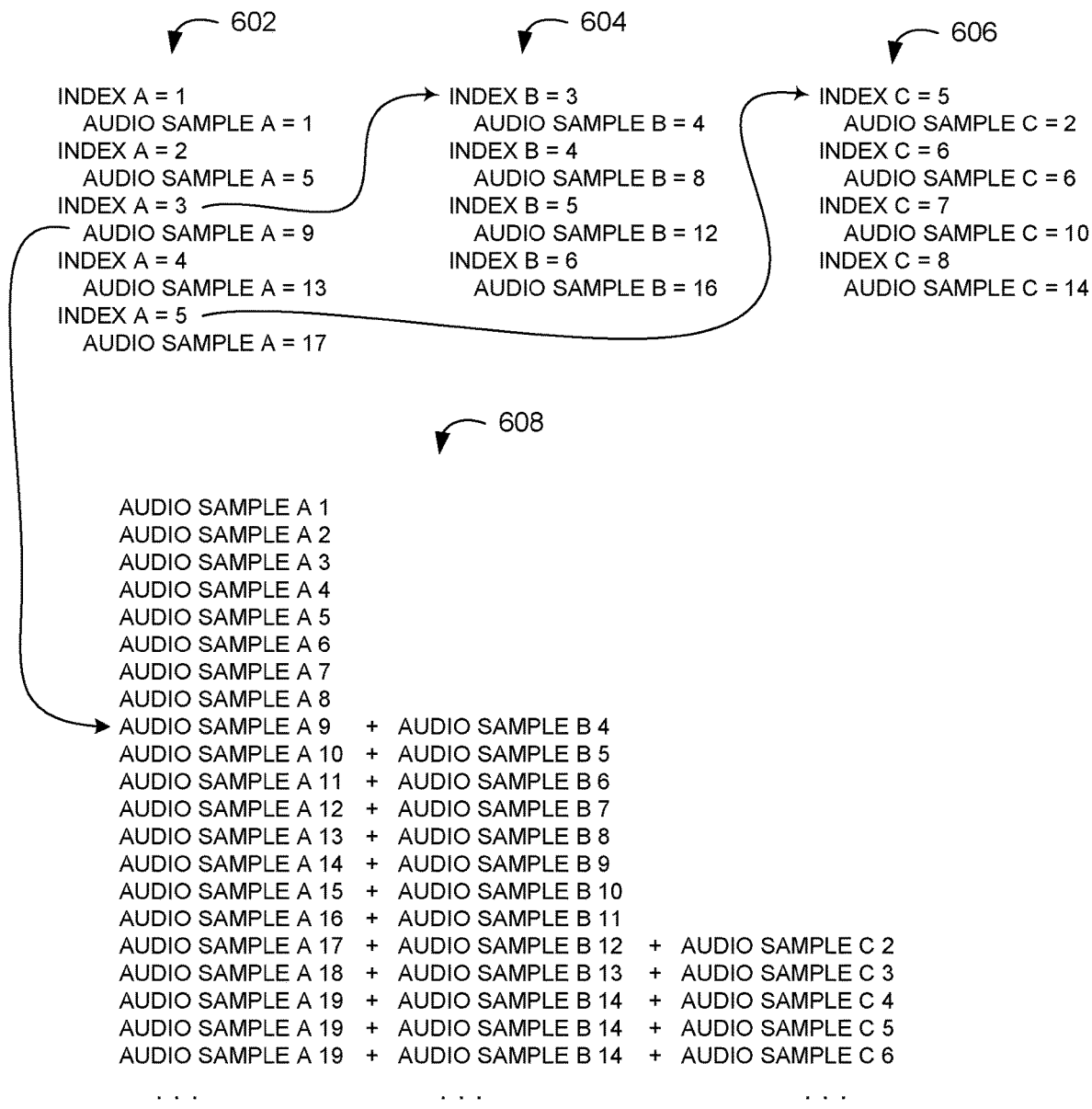
FIG. 6 shows how the host computer uses the index values and associated audio sample addresses to align and merge audio data.

The Host Computer Uses the Index Values and Associated Audio Sample Addresses to Align and Merge Audio Data, FIG. 6

We now turn to the processing operation of the host computer for uploaded files. FIG. 6 shows the method for using index values to align uploaded files from multiple recording devices—in this example, three. In order to aid understanding, this example assumes that indexes occur every four audio samples, whereas in actual operation, indexes would occur over spans of thousands of audio samples.

The index and associated audio sample addresses 602 of the first file "A" (group 512 in FIG. 5) begin with a value of one, implying that the associated recording device was activated first, and became the master. The index and associated audio sample addresses 604 of the second file "B" begin with an index value of three, indicating that the associated recording device was activated later, becoming a slave, and that the first index value received from the master was the value three. In this case, when the master index value of three was received, the "B" recording device had already stored four samples. The index and associated audio sample addresses 606 of the third file "C" begin with an index value of five, indicating that this associated recording device was activated after both the master "A" and the second recording device "B". In this case recording device "C" had already stored two audio samples with it received its first index from the master.

Aligned and merged audio samples 608 are ordered by matching audio samples from different files with others of the same index value. Thus, audio sample 4 of the "B" file 604 is aligned with audio sample 9 of the "A" file 602 since these audio samples are both associated with an index value of 3. Similarly, audio sample 2 of the "C" file 606 is aligned with audio sample 17 of the "A" file 602 since these audio samples are both associated with an index value of 5. In this way, the audio samples of the three files are merged such that the audio samples from the three files that are added to create a merged audio value are those that occurred at effectively the same time during recording.

Since the recording devices are invariably started at different times, the final merged file will invariably begin with samples from just one recording device, joined by samples from a second recording device, and so on, as shown in FIG. 6.

Figure 7:
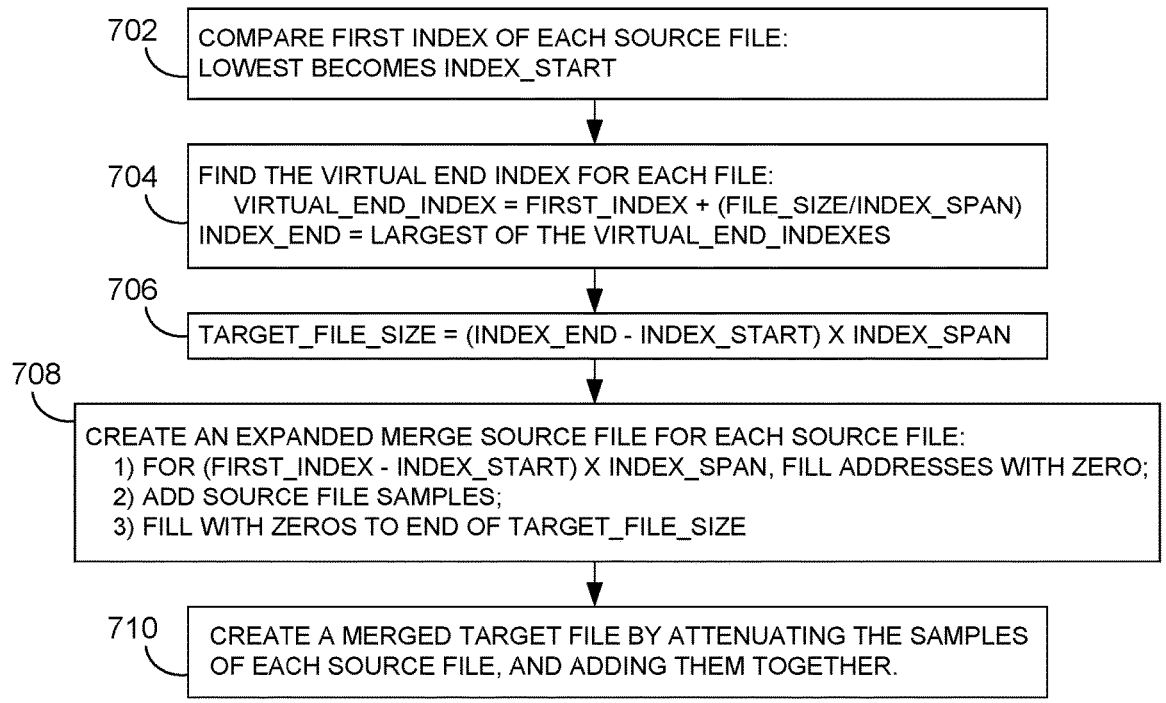
FIG. 7 shows the host computer processing steps to create a merged multi-track file.

Host Computer Processing Steps to Create a Merged Multi-Track File, FIG. 7

FIG. 7 shows a summary of the general steps taken by the host computer to merge the uploaded files from recording devices. In the first step, 702, the file with the lowest value index is determined by comparing the first index value of each uploaded file. This lowest-value index is labeled "INDEX_START," and the audio samples of that associated file comprise the beginning of the target merged file, as shown previously in FIG. 6.

In the event that a master recording device is stopped before that of the slave recording devices, the slave recording devices would continue recording, but without associated index values from the master. Therefore, in the next step, 704, virtual ending indexes are deduced for each uploaded slave file by calculating the number of total index spans, which is the audio file size divided by the number of audio samples comprising the span between index occurrences, and this quantity is then added to the value of the first index of that file as "VIRTUAL_END_INDEX", i.e.:

VIRTUAL_END_INDEX=FIRST_INDEX+FILE_SIZE/INDEX_SPAN where VIRTUAL_END_INDEX is the virtual ending index, "FIRST_INDEX" is the value of the first index of the file, "FILE_SIZE" is the file size 502 in FIG. 5, and "INDEX_SPAN" is the number of audio samples between index occurrences, which is the audio sample rate divided by the index rate. In the case of the preferred embodiment the index span is 44.1 KHz/10 Hz=4,410 audio samples.

Once the virtual ending indexes of all the files are determined, the largest of these is labeled as "INDEX_END."

The merged target file size "TARGET_FILE_SIZE" is then calculated in step 706, and is equal to the total number of indexes (INDEX_END minus INDEX_START) multiplied times INDEX_SPAN.

Step 708 then expands each file such that it has as many audio sample entries as the calculated merged target TARGET_FILE_SIZE. Except for the file that contained the lowest index value (INDEX_START), the first audio sample of each of the rest of the files associated with that file's first index does not begin at the start of the merged target file, as shown by audio file samples 604 ("B") and 606 ("C") in FIG. 6. The audio sample entries in the expanded versions are filled with zeros from the beginning to the that file's recorded audio sample occurrence associated with that file's FIRST_INDEX, again as shown in FIG. 6. The quantity of zero entries to fill is equal to the number of indexes between the beginning of the merged target file to the first index of that unexpanded file, multiplied by INDEX_SPAN. Zero entries are also added at the end of each expanded file, from the last uploaded audio sample to TARGET_FILE_SIZE.

The final step 710 adds the audio samples across the same address of the expanded files as shown earlier in FIG. 6. Note that since the uploaded audio samples are of the signed binary form, this addition is done with simple binary arithmetic. Note also that, depending on the sample amplitude levels across the uploaded files, attenuation prior to addition may be necessary. Execution of merge attenuation is well known in the art.

Sample Alignment with Regard to Differing Clock Rates

A recurring problem tackled by previous attempts to synchronize multiple audio streams, as described for example in the descriptions of prior art, is the fact that isolated recording devices generally use local processing clocks that are not synchronized together. Thus, over time the audio sampling of any one of the various recording devices pulls ahead or falls behind those of others, so that even if the recordings are time-aligned at the beginning, over time, they become progressively unsynchronized. This is a serious failing for applications that require precise phase synchronization, such as synchronized microphone array systems that use time arrival differences to geographically locate audio sources, e.g., scientific investigations of bird habitats. The problem is exasperated when the recording continues for extended periods of time, again as evidenced by bird habitat investigations.

In the context of this invention, however, it is recognized that the application is tolerant to a degree of unsynchronized sampling clock rates. Off-the-shelf clock oscillators, such as would be used in inventive recording devices, that are accurate to one PPM (parts per million) are readily available. Time delays of up to 10 milliseconds are considered acceptable in audio recordings, the equivalent of the delay encountered when one microphone is nine feet from another. At one PPM clock difference, recordings aligned at the beginning would run for 167 minutes before the samples drifted 10 milliseconds apart, far longer than any practical session of recording.

Further, since the audio samples occur on the order of tens of microseconds apart (23 microseconds in the case of the preferred embodiment), along the same reasoning the resolution of initial alignment between recording devices of inventive index/sample address pairs need not be a single sample, i.e., real-time processing of time markers and logical handling by slave devices may result in one or two samples of time difference with the master with no discernible effect.

Even in the event that the recording device clock oscillators are greater than one PPM in accuracy, coupled, for example, with an unusually long recording session, the inventive method of using a series of time marker indexes allows re-alignment of multiple audio files later in the recording. In FIG. 6, the earliest occurring indexes were used to create an initial alignment, but it can be seen that, using the same method, any index at any point in any file could be aligned with the same index of other files, thus aligning all the files in time at that point. Since, for example, musical recording sessions typically consist of individual songs or pieces, re-alignment could easily be done between songs or pieces.

Figure 8:
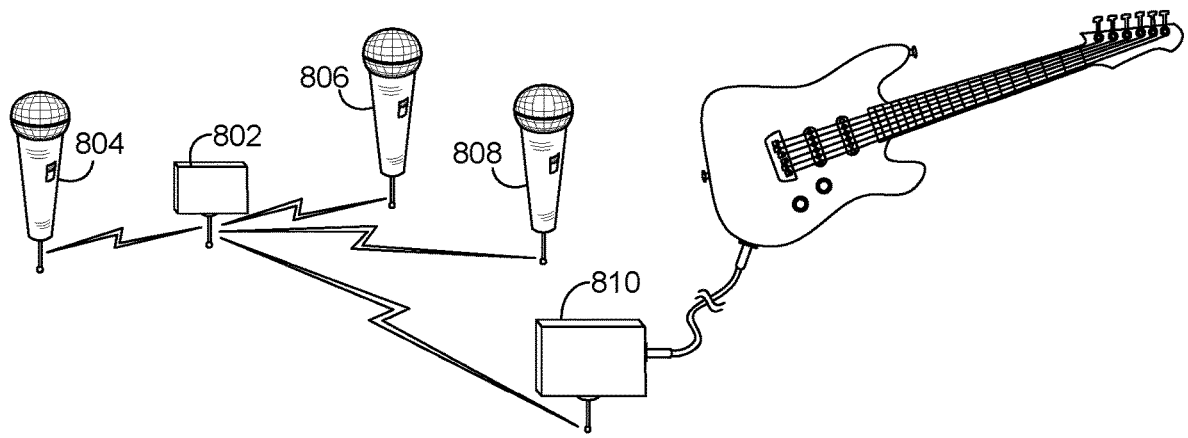
FIG. 8 shows a dedicated master device providing time markers and index values.

A Dedicated Master Device Providing Time Markers and Index Values, FIG. 8

Instead of one of the recording devices assuming the role of master and providing periodic time markers and associated index values, recording devices could be dedicated as slaves, and the time markers and associated index values could be communicated by a dedicated master device. This is shown in FIG. 8, where master device 802 broadcasts time markers and index values to microphones 804, 806, and 808, and auxiliary recording device 810. The dedicated master device in this case need not have audio recording capability.

CONCLUSION, RAMIFICATIONS, AND SCOPE

It can be seen that by the distributed recording means described above inventively outfitted microphones and instrument adapters work together to individually record sessions that can later be merged to emulate a centralized multi-track recorder. During a session, each user simply begins and stops recording with their device at their convenience, unmindful of the index exchanges happening automatically. Also, since a master device communicates directly with slave recording devices, use of unreliable indoor GPS information is avoided, thus achieving the original goals set forth above.

Since the methods do not require high performance electronics, the inventive feature could be incorporated into, e.g., microphones at a very reasonable cost. The associated host computer software could be as simple as merely producing a merged file for listening, or could include sophisticated editing capabilities as already exist in studio systems.

Although the preferred embodiment has been described in the context of musical performances, it will be recognized that the inventive method of creating a distributed virtual multi-track recorder could apply to any number of other applications, such as recording meetings.

The various nomenclatures used in this invention are not intended in any way to limit the scope of the invention; and thus, there is no intent of excluding equivalents, but on the contrary it is intended to cover any and all equivalents that may be employed without departing from the spirit and scope of the invention.

The invention claimed is:

1. A distributed recording system providing coordinated playback, comprising:
   a) a master device that periodically communicates a series of time markers and index values, wherein,
      i) said time markers are predetermined patterns that define an instant in time;
      ii) said index values are unique from one occurrence to the next,
   b) recording devices that assume the role of slaves, wherein,
      i) each of said recording devices are capable of digitizing a consecutive series of audio samples at a sampling rate and storing each audio sample of said consecutive series of digitized audio samples at a unique storage memory address, wherein,
      i) said recording devices receive said communicated time markers and index values from said master device;
      ii) upon receiving a said time marker, said recording devices record both the received said index value and an associated one of said unique storage memory addresses that stores a specific audio sample of said consecutive series, said specific audio sample occurring substantially close in time to said received time marker;
      iii) said recording devices include means to upload said digitized audio samples, recorded said index values, and recorded said associated unique storage memory addresses to a host computer;
   c) said host computer uses said uploaded index values and said associated storage memory addresses to align said digitized audio samples of said slave recording devices so that said audio samples of said recording devices that occurred at nearly the same time are paired together,
   whereby when reproduced together, the consecutive series of audio samples of said slave recording devices are coordinated as though they were recorded together on one recording machine.

2. A distributed recording system according to claim 1, wherein said master device communicates said time markers and said index values to said slave recording devices across a wireless radio frequency link.

3. A distributed recording system according to claim 1, wherein said recording devices use received said index values as storage addresses for storing said associated unique storage memory addresses.

4. A distributed recording system according to claim 1, wherein said host computer uses identical index values across all uploaded data files from said recording devices to align said digitized audio samples according to their said associated storage memory addresses.

5. A distributed recording system according to claim 1, wherein at least one of said recording devices is a handheld microphone.

6. A distributed recording system according to claim 1, wherein, when activated to record, each of said recording devices waits for a predetermined period of time, and if no said time marker is detected, automatically assumes said master role, and if a said time marker is detected, automatically assumes said slave role.

* * * * *